United States Patent Office 2,954,264
Patented Sept. 27, 1960

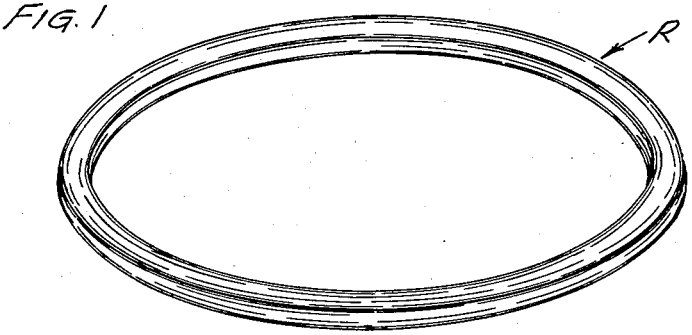
Sept. 27, 1960  R. E. TISCH ET AL  2,954,264
SEALING RING
Filed March 4, 1957
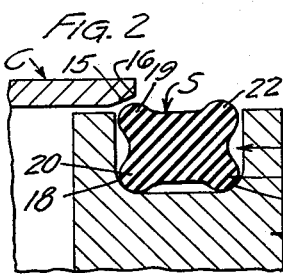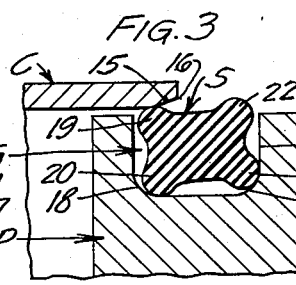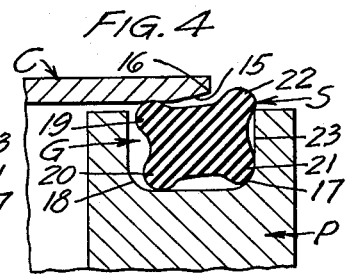
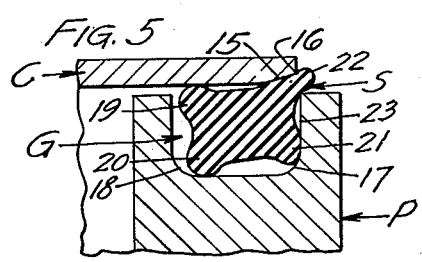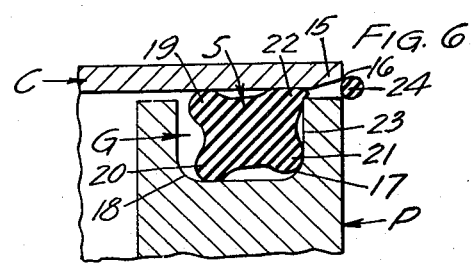
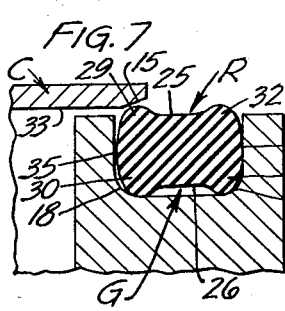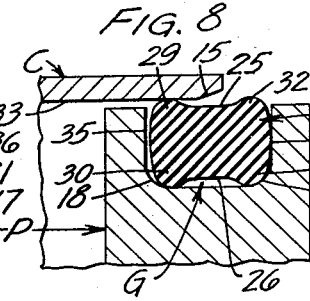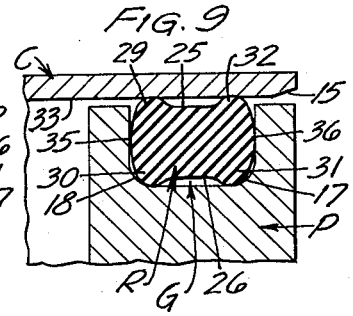
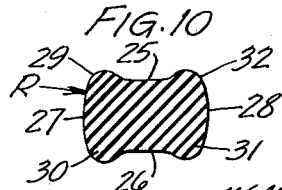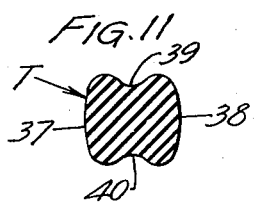
INVENTORS
RICHARD E. TISCH
GEORGE E. CARLSON
BY
Williamson, Schroeder, Adams, & Meyers
ATTORNEYS

2,954,264

SEALING RING

Richard E. Tisch and George E. Carlson, Minneapolis, Minn., assignors to A-P-D Co., Minneapolis, Minn., a corporation of Minnesota Filed Mar. 4, 1957, Ser. No. 643,716

6 Claims. (Cl. 309—23)

This invention relates to sealing rings. More particularly it relates to sealing rings designed to perfect a seal between two sealing surfaces wherein one of the surfaces must be slid over the other in the assembly of parts between which the seal must be maintained.

It has been found that in the installation of sealing rings the sealing ring itself is often seriously damaged so that an imperfect or a less effective seal is provided. This is especially true where the device in which the seal is needed can be assembled only by sliding one of the sealing surfaces relative to the other, as for example, in the assembly of a piston within a cylinder. It has been found that in such instances a part of the sealing ring is often sheared off during the assembly so that after installation the sealing ring no longer has the cross-sectional shape best suited for perfecting an adequate seal.

The damage to the sealing ring referred to in the immediately preceding paragraph is particularly detrimental where the sealing ring is of a type which has been found to provide an improved seal as compared to an O-ring which has enjoyed wide-spread use in the past. This type of sealing ring is generally rectangular in cross-section and has concavely shaped sides and convexly shaped lobes at each of its corners which contact the bottom of the groove and the opposed sealing surface to provide an effective and efficient seal. Such sealing rings are made of such dimensions that when one is positioned within the sealing groove formed in one of the sealing members, such as a piston, it extends outwardly slightly beyond the confines of the groove and bears against the sealing surface oppositely disposed relative to the groove in order to perfect the seal. When such a sealing ring is installed within the groove of a piston, for example, and the piston is slid into the cylinder, the forward outer lobe of the sealing ring is squeezed inwardly toward the bottom of the groove and the ring shifts axially of the groove and against the trailing side wall of the groove. As it does so, the trailing inner lobe will ride upwardly over the radiused bottom corner of the groove and as a result, the trailing outer lobe will extend so far outwardly beyond the confines of the groove that portions thereof will be pinched off by the end of the cylinder during the process of squeezing that lobe into the groove. This outer corner lobe is a part of the sealing contact or lip of the sealing ring which normally prevents rocking, rolling and spiral twisting of the sealing ring and hence the seal provided by the damaged sealing ring will not be as effective and efficient as it should be and it will not last as long as it would have, had it not been damaged. Our invention is designed to avoid such damage to sealing rings during installation thereof and the assembly of the parts between which the seal is needed.

It is standard machining practice in forming a sealing groove within a member to radius the bottom corners of the groove. In fact, it is almost impossible and certainly impractical to form such a groove without radiusing, at least to some extent, the corners at the bottom of the groove. In practice, it is common to use a considerable radius at these corners because it makes it much easier to form the groove. As a result, almost all sealing grooves in pistons and the like have bottom corners of substantial radius and the damage involved in the installation of such rings as described hereinbefore, is only too prevalent. In view of these facts, wherever hereinafter reference is made to a sealing groove, it is intended to connote a sealing groove having bottom corners which have at least some radius and, in all probability, a substantial radius.

It is a general object of our invention to provide a novel and improved sealing ring of simple and inexpensive construction for use in sealing grooves where one sealing surface must be slid over the other sealing surface in order to assemble the device in which the seal is needed.

A more specific object of our invention is to provide a novel and improved sealing ring so designed as to preclude damage thereto during its installation in a sealing groove where one sealing surface must be slid over the other sealing surface in order to assemble the device in which the seal is needed.

Another object is to provide a novel and improved sealing ring having a unique cross-sectional configuration which eliminates installational damage to the sealing ring while the latter is being installed in a sealing groove where one sealing surface must be slid over the other sealing surface in order to assemble the device in which the seal is needed.

Another object of our invention is to provide a novel and improved sealing ring having a unique cross-sectional configuration which, during installation and assembly of the device in which the seal is needed, prevents the sealing ring from riding upwardly on the radiused bottom corner of the sealing groove and thereby precludes the sealing ring from having a portion of one of its sealing contacts cut away with consequent damage to the seal.

These and other objects and advantages of our invention will more fully appear from the following description, made in connection with the accompanying drawings, wherein like reference characters refer to the same or similar parts throughout the several views, and in which:

Fig. 1 is a perspective view of one embodiment of our invention;

Fig. 2 is a fragmentary sectional view of a piston with a sealing groove formed therein about to enter its cylinder with a sealing ring, as heretofore known, installed in the groove;

Fig. 3 is a fragmenary sectional view of the piston and cylinder shown in Fig. 2 illustrating the progress of the piston and the effect thereof upon the sealing ring;

Fig. 4 is a fragmentary sectional view showing the piston and cylinder of Figs. 2 and 3 and illustrating the progress of the piston and the effect thereof upon the sealing ring, particularly illustrating how the sealing ring rides upwardly on the radiused bottom corner of the groove;

Fig. 5 is a fragmentary sectional view showing still further progress of the piston into the cylinder of Figs. 2–4 and particularly illustrating how the trailing outer corner lobe is pinched between the outer edge of the sealing groove and the end of the cylinder;

Fig. 6 is a fragmentary sectional view showing still further progress of the piston into the cylinder of Figs. 2–5 and particularly illustrating how a section of the outer corner lobe is severed from the conventional sealing ring;

Fig. 7 is a fragmentary sectional view of the same cylinder and piston as shown in Figs. 2-5 but with a sealing ring having a new and improved cross-sectional configuration installed within the sealing groove, the piston being in a position corresponding to that shown in Fig. 2;

Fig. 8 is a fragmentary sectional view showing the same piston cylinder and sealing ring as shown in Fig. 7 with the piston in a position corresponding to that shown in Fig. 4 and illustrating how the particular configuration of our sealing ring precludes upward riding of the ring on the radiused bottom corner of the groove;

Fig. 9 is a fragmentary sectional view of the same piston, cylinder and sealing ring shown in Figs. 7-8, the piston and cylinder having been assembled and the position of the piston corresponding to that shown in Fig. 6;

Fig. 10 is a cross-sectional view of the preferred form of our improved sealing ring; and Fig. 11 is a cross-sectional view of a modified form of our sealing ring.

Figs. 2-6 illustrate the difficulties experienced in assembling a device wherein the sealing surfaces must be slid relative to each other in a direction transversely of the sealing groove. Figs. 2-6 show a cylinder indicated generally as C having a chamfered end portion 15 and a relatively sharp edge 16 at the extreme end thereof. A piston P is illustrated as entering the cylinder C in order to assemble the two sealing members P and C into sealing position. The piston P has an annular groove G formed in the periphery thereof and this groove, as is conventional in machining practices, has been formed with radiused corners 17 and 18 at the bottom thereof. As previously described hereinbefore, sealing grooves always have a certain amount of radius as a practical matter and generally have a relatively large radius as shown in Figs. 2-6.

Mounted within the sealing groove G is a sealing ring S having a cross-sectional configuration which is generally rectangular and which has a plurality of outwardly extending convexly shaped corner lobes 19, 20, 21 and 22, the lobes 19 and 22 constituting the outer lobes and the lobes 20 and 21 constituting the inner lobes. It will be noted that these lobes 19, 20, 21 and 22 extend outwardly beyond the general cross-sectional outline of the ring and that the inner lobes 20—21 bear against the radiused bottom corners 18 and 17, respectively.

As the piston P progresses into the cylinder C as best shown in Fig. 3, the forward outer lobe 19 engages the chamfered surface 15 of the cylinder C and the sealing ring S tends to slide toward the trailing side wall 23 of the groove G. As it does so, the trailing inner lobe 21 rides upwardly along the radiused bottom corner 17 so that the ring is tilted or askew, speaking cross-sectionally, as clearly shown in Fig. 3. When this takes place, the trailing outer corner 22 moves outwardly a substantial distance beyond the confines of the groove as compared to its position in Fig. 2.

As the piston P progresses as shown in Fig. 4, the flowable material from which such a sealing ring is conventionally made flows toward the trailing portion of the groove with the result that the outer corner lobe 22 is expanded as shown in Fig. 4 so that the outer corner lobe extends outwardly beyond the confines of the groove G to an even greater extent than shown in Fig. 3.

When the piston P reaches the position shown in Fig. 5, the chamfered surface 15 of the cylinder C engages the outwardly protruding corner lobe 22 and attempts to force it downwardly into the sealing groove G. The lobe 22, however, by this time extends outwardly to such an extent that it is impossible for the chamfered surface to successfully press all of that corner portion downwardly into the groove for the friction between the groove and the cylinder C is sufficient to cause the lower corner lobe 21 to tend to ride upwardly on the radiused bottom corner 17 to an even greater extent. As a result, when the relatively sharp edge 16 reaches a position opposite the trailing side wall 23, a portion 24 of the corner lobe 22 will be pinched off as is illustrated in Fig. 6. Since the sealing contacts are provided by the corner lobes, it can be readily appreciated that an imperfect and less effective seal will be provided by such a sealing ring S after an annular section 24 has been severed from the corner lobe 22 by the assembly of the two sealing members P and C as hereinbefore described.

Our sealing ring is constructed in such a manner as to obviate this damage caused to the sealing ring through its installation and the assembly of the sealing members P and C. As best shown in Fig. 1 and Fig. 10, our sealing ring is an annular ring-like member continuously formed throughout of a resilient flowable material such as rubber. As best shown in Fig. 10, our ring R is generally rectangular in cross-sectional configuration and has a pair of radially spaced sides 25 and 26 which are recessed and flat. It also has a pair of axially spaced sides 27 and 28 which are convexly shaped and extend outwardly beyond the general cross-sectional outline of the ring. Our ring also has convexly shaped lobes 29, 30, 31 and 32 at its corners and these corner lobes extend radially outwardly beyond the general cross-sectional outline of the ring. These corner lobes 29, 30, 31 and 32 provide the sealing contacts between the sealing surface 33 and portions of the groove of the cylinder C and piston P, respectively. The corner lobes 30 and 31 constitute inner corner lobes and the corner lobes 29 and 32 constitute outer corner lobes.

The assembly of the piston P within the cylinder C will not damage our sealing ring in the manner in which it will damage the sealing rings heretofore known. This can best be realized by reference to Figs. 7-9 wherein the installation and assembly of the sealing ring and the relatively moving parts C and P are illustrated. In Fig. 7, our sealing ring R, having the cross-sectional configuration hereinbefore described has already been installed within the groove G of the piston P. It will be noted that the convexly shaped axially spaced sides 27 and 28 are disposed oppositely the side walls 35 and 36 of the groove. As the piston moves inwardly to the position shown in Fig. 8, the corner lobe 29 engages the chamfered surface 15 and is compressed downwardly into the groove. The friction between the cylinder and the sealing ring R causes the sealing ring to shift toward the trailing side wall 36 of the groove and engage the same and bear thereagainst. The convex shape of the side 28, however, causes this side to engage the side wall 36 before the inner corner lobe 31 has an opportunity to ride upwardly on the radiused bottom corner 17 of the groove. This engagement between the convex side 28 and the side wall 36 prevents the sealing ring R from twisting within the groove and becoming askew, speaking cross-sectionally, as is illustrated in Fig. 8. Fig. 9 shows the piston P after it has moved inwardly sufficiently far so that the corner lobe 32 has been compressed into the groove without damage thereto. As a result, our sealing ring R provides an improved and more effective seal than sealing rings heretofore known in this type of installation. It will be readily appreciated that no damage will result to a sealing ring having the particular cross-sectional configuration defined herein as our improved sealing ring.

Fig. 11 shows a modified form of our sealing ring R which is formed substantially like the sealing ring R, speaking cross-sectionally, with the exception that it has a generally square cross-sectional outline. It has a pair of axially spaced convexly shaped sides 37 and 38 and a pair of concavely shaped radially spaced sides 39 and 40. It will be readily apparent that the advantages inherent in our ring R are also present in the form shown in Fig. 11 and identified generally as T. The preferred form R has an added advantage in that there is less tendency toward excessive wear on the ring when the end portions of the ring carrying the sides 27 and 28 are connected by a longer intermediate portion which is bounded by the sides 25 and 26, for such a longer intermediate coupling portion aids in precluding rocking, rolling and twisting of the ring.

It will, of course, be understood that various changes may be made in the form, details, arrangement and proportions of the parts without departing from the scope of our invention which consists of the matter shown and described herein and set forth in the appended claims.

What is claimed is:

1. A sealing device for use between the side walls of a sealing groove of ring-like configuration formed in one of a pair of opposed sealing surfaces and which, during assembly of the sealing surfaces into opposed sealing position, must slide in a direction transversely thereof past a relatively sharp edge formed on the other of the sealing surfaces, said device comprising a continuously formed ring-like member made of a resilient flowable material throughout and adapted to be fitted into such a sealing groove to perfect a seal between the opposed sealing surfaces, said ring-like member being generally rectangular in cross-sectional configuration and having in its free form a pair of recessed radially spaced sides and a pair of convexly shaped axially spaced sides and having a smoothly contoured continuously arcuate convexly shaped lobe at each of the corners between adjacent sides constituting inner and outer corner lobes, said axially spaced sides bulging axially outwardly relative to the general outline of said member and away from each other whereby during the installation of said device within such a groove and the assembly of the sealing surfaces into sealing position, one of said axially spaced sides will engage a side wall of the groove to preclude the inner corner lobe adjacent to said side from riding upwardly on the radiused bottom corner of the groove whereby the adjacent outer corner lobe will be precluded from being at least partially sheared off during such installation and assembly.

2. The structure defined in claim 1 wherein said ring-like member is generally square in cross-sectional configuration.

3. A sealing device for use between the side walls of a sealing groove of ring-like configuration formed in one of a pair of opposed sealing surfaces and which, during assembly of the sealing surfaces into opposed sealing position must slide in a direction transversely thereof past a relatively sharp edge formed on the other of the sealing surfaces, said device comprising a ring-like member made of a resilient flowable material and adapted to be fitted into such a sealing groove to perfect a seal between the opposed sealing surfaces, said ring-like member being generally rectangular in cross-sectional configuration and having in its free form a pair of radially spaced sides smoothly contoured and concave throughout and a pair of axially spaced sides and having a smoothly contoured convexly shaped lobe at each of the corners between adjacent sides constituting inner and outer corner lobes, one of said axially spaced sides being convexly shaped and extending axially outwardly relative to the general outline of said member and away from the other axially spaced side whereby during the installation of said device within such a groove and the assembly of the sealing surfaces into sealing position, said outwardly bulging side will engage a side wall of the groove to preclude the inner corner lobe adjacent to said side from riding upwardly on the radiused bottom corner of the groove whereby the adjacent outer corner lobe will be precluded from being at least partially sheared off during such installation and assembly.

4. The combination of a pair of members having opposed sealing surfaces between which a fluid pressure seal is needed, one of said surfaces having an elongated groove formed therein with side walls and with radiused corners at the bottom thereof which, during assembly of said surfaces into opposed sealing position must slide in a direction transversely thereof past a relatively sharp edge formed on the other of said sealing surfaces, an elongated sealing member made of a resilient flowable material throughout and fitted into said sealing groove, said sealing member being generally rectangular in cross-sectional configuration and having smoothly contoured convexly shaped lobes at each of its corners constituting a pair of inner corner lobes and a pair of outer corner lobes, the overall width of said sealing member being slightly less than the width of said sealing groove and the overall depth of said sealing member prior to installation in said groove being slightly greater than the depth of said sealing groove, said sealing member in its free form having a pair of smoothly contoured inner and outer spaced sides concave in shape throughout and having a pair of convexly shaped side-wall engaging sides bulging outwardly away from each other and engaging at least one of the side walls of said groove whereby during the assembly of said sealing surfaces into sealing position, said outwardly bulging side will engage a side wall of said groove to preclude the inner corner lobe adjacent to said outwardly bulging side from riding upwardly on the radiused bottom corner of said groove whereby the adjacent outer corner lobe will be precluded from being at least partially sheared off by the relatively sharp edge on the opposed sealing surface during such installation and assembly.

5. A sealing device for use between the side walls of a sealing groove of ring-like configuration having radiused corners at the bottom thereof formed in one of a pair of opposed sealing surfaces and which, during assembly of the sealing surfaces into opposed sealing position, must slide in a direction transversely thereof past a relatively sharp edge formed on the other of the sealing surfaces, said device comprising an elongated sealing member made of a resilient flowable material and adapted to be fitted into such a sealing groove to perfect a seal between the opposed sealing surfaces, said sealing member being generally rectangular in cross-sectional configuration and having in its free form a pair of recessed inner and outer sides smoothly contoured throughout and a pair of spaced side-wall-engaging sides adapted to engage the side walls of such a groove when installed therein and having a smoothly contoured convexly shaped lobe at each of its corners between adjacent sides constituting inner and outer corners lobes, said side-wall-engaging sides curving outwardly at their radially intermediate portions relative to the general outline of said member and away from each other whereby during the installation of said member within such a groove and the assembly of the sealing surfaces into sealing position, one of said outwardly curved sides will engage a side wall of the groove to preclude the inner corner lobe adjacent to said side from riding upwardly on the radiused bottom corner of the groove whereby the adjacent outer corner lobe will be precluded from being at least partially sheared off during such installation and assembly.

6. A sealing device for use between the side walls of a sealing groove of ring-like configuration having radiused corners at the bottom thereof formed in one of a pair of opposed sealing surfaces and which during assembly of the sealing surfaces into opposed sealing position must slide in a direction transversely thereof past a relatively sharp edge formed on the other of the sealing surfaces, said device comprising a continuously formed ring-like member made of a resilient flowable material throughout and adapted to be fitted into such a sealing groove to perfect a seal between the opposed sealing surfaces, said sealing member being generally rectangular in cross-sectional configuration and having in its free form a pair of radially spaced smoothly contoured and concavely shaped throughout sides and a pair of axially spaced sides and having a smoothly contoured and convexly shaped lobe at each of the corners between adjacent sides constituting inner and outer corner lobes which extend outwardly beyond the general cross-sectional outline of said ring-like member, said axially spaced sides being shaped convexedly throughout and extending outwardly relative to the general outline of said member and away from each other whereby during the installation of said device within such a groove and the assembly of the sealing surfaces into sealing position, one of said axially spaced sides will engage a side wall of the groove to preclude the inner corner lobe adjacent to said side from riding upwardly on the radiused bottom corner of the groove whereby the adjacent outer corner lobe will be precluded from being partially sheared off during such installation and assembly.

References Cited in the file of this patent

UNITED STATES PATENTS

| | | |
|---|---|---|
| 220,461 | Eaton | Oct. 7, 1879 |
| 2,392,182 | Payne | Jan. 1, 1946 |
| 2,700,561 | Svenson | Jan. 25, 1955 |
| 2,747,954 | Damm et al. | May 29, 1956 |
| 2,841,429 | McCuistion | July 1, 1958 |
| 2,874,807 | Hahn | Feb. 24, 1959 |

FOREIGN PATENTS

| | | |
|---|---|---|
| 844,623 | France | July 28, 1939 |
| 547,066 | Great Britain | Aug. 12, 1948 |